United States Patent [19]
Meier et al.

[11] Patent Number: 5,852,138
[45] Date of Patent: Dec. 22, 1998

[54] STABILIZER MIXTURES AND THEIR USE IN POLYCARBONATES

[75] Inventors: Helmut-Martin Meier, Ratingen; Hartmut Löwer; Wolfgang Ebert, both of Krefeld; Wilfried Haese, Odenthal, all of Germany

[73] Assignee: Bayer Aktiengesellschaft, Leverkusen, Germany

[21] Appl. No.: 795,555

[22] Filed: Feb. 6, 1997

[30] Foreign Application Priority Data

Feb. 12, 1996 [DE] Germany .................. 196 04 990.3

[51] Int. Cl.$^6$ .................................................. C08F 283/02
[52] U.S. Cl. ........................ 525/463; 351/591; 524/414
[58] Field of Search .......................... 525/463; 524/414; 351/591

[56] References Cited

U.S. PATENT DOCUMENTS

| | | |
|---|---|---|
| Re. 32,046 | 12/1985 | Eimers . |
| 4,367,303 | 1/1983 | Eimers et al. . |
| 4,375,525 | 3/1983 | Idel et al. ................................. 524/108 |
| 5,627,256 | 5/1997 | Meier et al. ............................ 528/198 |

FOREIGN PATENT DOCUMENTS

| | | |
|---|---|---|
| 0 019 212 | 11/1980 | European Pat. Off. . |
| 043 998 | 4/1984 | European Pat. Off. . |
| 0 422 438 | 4/1991 | European Pat. Off. . |
| 33 32 065 | 3/1985 | Germany . |
| 44 45 786.2 | 12/1994 | Germany . |

*Primary Examiner*—Melvyn I. Marquis
*Assistant Examiner*—D. Aylward
*Attorney, Agent, or Firm*—Connolly and Hutz

[57] ABSTRACT

The invention provides stabilizer mixtures comprising phosphines, silicon compound and optionally silicon-free oxetane compounds and/or silicon-free epoxide compounds and their use for stabilizing thermoplastic aromatic polycarbonates.

10 Claims, No Drawings

STABILIZER MIXTURES AND THEIR USE IN POLYCARBONATES

The invention provides mixtures comprising

A) phosphines of formula (I)

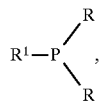

in which R is an unsubstituted $C_6$–$C_{14}$-aryl group and in which $R^1$ is one of the following groups (Ia) to (Ih)

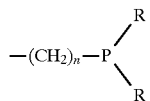

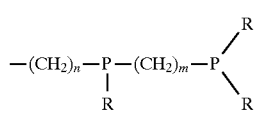

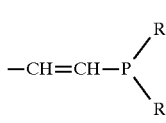

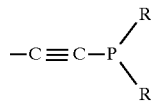

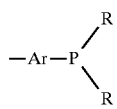

with Ar = $C_6$–$C_{14}$-arylene,

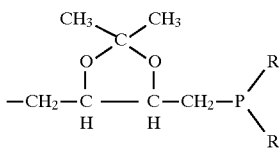

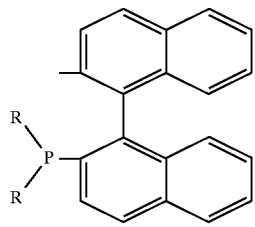

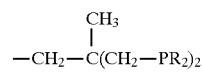

in which R has the meaning quoted for formula (I), "n" and "m" are a whole number from 1 to 7, independently of each other in each case;
wherein the H-atoms of groups (Ia) to (Ic) can also be replaced by F, Cl,

and wherein $R^1$ can also be 4-phenyl-phenyl or α-naphthyl when both R's in formula (I) are also 4-phenyl-phenyl or α-naphthyl in each case, wherein the 4-phenyl-phenyl or α-naphthyl groups can also be substituted, and B) silicon compounds of formula (II)

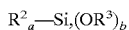

in which a+b=4, b is at least 1, preferably 3 or 4, $R^2$ is H or $C_1$–$C_{18}$-alkyl, $C_2$–$C_{18}$-alkenyl, $C_6$–$C_{24}$-aryl, $C_7$–$C_{24}$-alkylaryl or $C_7$–$C_{24}$-aralkyl and $R^3$ is $C_1$–$C_{18}$-alkyl, $C_2$–$C_{18}$-alkenyl, $C_5$–$C_{10}$-cycloalkyl or $C_7$–$C_{24}$-aralkyl, wherein the molar ratio of (A) to (B) is between 0.01 and 3.5, preferably between 0.1 and 1.5.

The mixtures according to the invention are suitable for stabilizing thermoplastic polycarbonates.

The invention therefore also provides the use of the mixtures according to the invention for stabilizing thermoplastic aromatic polycarbonates.

Mixtures of phosphines and silicon compounds are known. (See, for example, EP 43 988 (LeA 20 430) and/or US-Re 32 046 and DE-OS 33 32 065 (Le A 22 588)).

Such mixtures do, however, have the disadvantage that the phosphorus contents are high, so that a large quantity of oxidized phosphorus compounds which ultimately has a negative effect on the colour of the polycarbonates, occurs in the course of long-term ageing.

In contrast, the mixtures according to the invention have the advantage that the phosphorus contents are low; the amount of oxidized phosphorus structures also remains low and an improved effect compared with the prior art is achieved at the same time.

The addition of the phosphines (I) to polycarbonates is described in the prior German patent application P 44 45 786.3 (LeA 30 767) of 21.12.1994.

In component A preferred R groups in (I) are phenyl, 4-phenyl-phenyl and naphthyl. Suitable substituents of the aryl groups R in (I) are F, Cl, Br, I, $OCH_3$, CN, $C_1$–$C_5$-alkylcarboxy, phenyl, cycloalkyl and $C_1$–$C_5$-alkyl.

Suitable substituents for the 4-phenyl-phenyl and α-naphthyl groups are F, Cl, $CH_3$, $C_2$–$C_5$-alkyl, cyclohexyl and aryl.

Preferred numbers "n" and "m" are 1, 2, 3 or 4.

Examples of the phosphines of formula (I) to be used according to the invention are 1,2-bis-(di-pentafluorophenyl-phosphino)-ethane,
bis-(diphenyl-phosphino)-acetylene,
1,2-bis-(diphenylphosphino)-benzene,

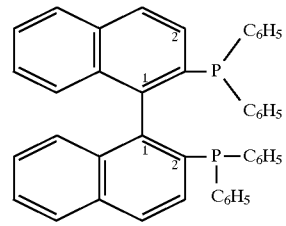

[2,2'-bis-(diphenylphosphino)-1,1'-binaphthyl],
2,3-bis-(diphenylphospiino)-butane,
1,4-bis-(diphenylphosphino)-butane,
1,2-bis-(diphenylphosphino)-ethane, cis-1,2-bis-(diphenylphosphino)-ethylene,

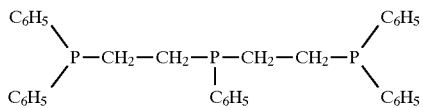

[bis-(2-diphenylphosphino)-ethyl]-phenylphosphine],
bis-(diphenylphosphino)-methane,
2,4-(diphenylphosphino)-pentane,
1-3-bis-(diphenylphosphino)-propane,
1,2-bis-(diphenylphosphino)-propane,

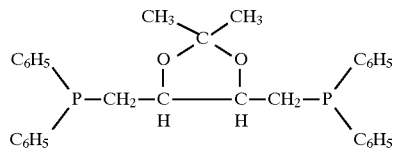

[4,5-O-isopropylidine-2,3-dihydroxy-1,4-bis-(diphenylphosphino)-butane],
tri-(4-diphenyl)-phosphine,
tris-(α-naphthyl)-phosphine and
1,1,1-tris-(diphenylphosphino-methyl)ethane.

The compounds of formula (I) are either known in the literature or can be produced according to the following literature references: Issleib et al., Chem. Ber. 92 (1959), 3175, 3179 and Hartmann et al., Zeitschr. Anorg. Ch. 287 (1956), 261, 264.

In the silicon compounds of formula (II) the alkyl and/or alkenyl groups may be linear or branched and contain oxirane or oxetane groups.

The C-groups $R^2$ and $R^3$ may contain any non-basic substituents which are thermally stable and inert in the thermoplastic processing of the polycarbonates, such as halogen atoms, for example, such as chlorine or bromine, $C_1$–$C_{18}$-alkoxy groups, $C_6$–$C_{24}$-aryloxy groups, heterocyclic groups with oxygen, sulphur and/or non-basic nitrogen atoms, keto groups, ester groups, nitrile groups, ether groups and/or thioether groups.

Examples of preferred $R^2$ groups are:
methyl, ethyl, vinyl, propyl, 3-chloropropyl, 3-methacryloxypropyl, 3-glycidyloxypropyl, butyl, pentyl, hexyl, cyclohexyl and phenyl.

Examples of preferred $R^3$ groups are:
butyl, pentyl, hexyl, octyl, stearyl, decyl, cyclohexyl, methyl-cyclohexyl, (3-methyloxetanyl-3)-methyl, (3-ethyloxetanyl-3)-methyl, (3-amyloxetanyl-3)-methyl, 2-methoxy-ethyl, 3-methoxy-propyl, 3-methoxy-prop-2-yl, 3-ethoxy-prop-2-yl, 3-ethoxy-propyl, 3-(thiomethyl)-propyl, (5-ethyl-1,3-dioxanyl-5)-methyl and 2,3 epoxy-propyl.

The silicon compounds (II) are either known in the literature (see, for example, EP-A-0 507 178 (LeA 28 232) or can be produced according to known methods (see, for example, D Ridge and M Todd, J. Chem. Soc. 1949, p. 2637–2640 or V Bavzant, V Chvalovsky, J Rathousky: Organosilicon Compounds, vol. 1, p. 51–61, Academic Press, New York 1965).

Examples of the silicon compounds of formula (II) to be used according to the invention are:
Tetrabutoxysilane,
Tetrapentoxysilane,
Tetrahexoxysilane,
Tetraoctoxysilane,
Tetradecoxysilane,
Tetrastearoxysilane,
Tetra-cyclohexoxysilane,
Tetracis-(methyl-cyclohexoxy)-silane,
Methyl-tributoxysilane,
Methyl-trihexoxysilane,
Methyl-trioctoxysilane,
Methyl-tridecoxysilane,
Methyl-tristearoxysilane,
Methyl-tri-cyclohexoxysilane,
Methyl-tris-(methyl-cyclohexoxy)-silane,
Vinyl-tributoxysilane,
Vinyl-trioctoxysilane,
Vinyl-trihexoxysilane,
Vinyl-tristearoxysilane,
Vinyl-tricyclohexoxysilane,
Vinyl-tris-(methyl-cyclohexoxy)-silane,
Tributoxysilane,
Trihexoxysilane,
Trioctoxysilane,
Tridecoxysilane,
Tetracis-(2-oxyethyl-ethoxy)-silane,
Phenyl-tris-(3-methoxy-2-propoxy)-silane,
Methyl-tris-(2-oxyethyl-ethoxy)-silane,
Vinyl-tris-(2-oxyethyl-ethoxy)-silane,
Vinyl-tris-(2-methoxy-ethoxy)-silane,
Methyl-tris-(2-methoxy-ethoxy)-silane,
3-chloropropyl-triethoxysilane,
3-chloropropyl-tributoxysilane,
3-chloropropyl-trihexoxysilane,
3-chloropropyl-trioctoxysilane,
3-glycidylpropoxy-triethoxysilane,
3-glycidylpropoxy-tributoxysilane,
3-glycidylpropoxy-trihexoxysilane,
3-glycidylpropoxy-trioctoxysilane,
Iso-butyl-tributoxysilane,
Iso-butyl-trioctoxysilane,
Tetracis-(2-methoxyethoxy)-silane,
3-methacryloxypropyl-trimethoxysilane,
Tetracis-[(3-methyloxetanyl-3)-methoxy]-silane,
Tetracis-[(3-ethyloxetanyl-3)-methoxy]-silane,
Tetracis-[3-amyloxetanyl-3)-methoxy]-silane,
Methyl-tris-[(3-methyloxetanyl-3)-methoxy]-silane,
Methyl-tris-[(3-ethyloxetanyl-3)-methoxy]-silane,
Dimethyl-bis-[(3-methyloxetanyl-3)-methoxy]-silane,
Dimethyl-bis-[(3-ethyloxetanyl-3)-methoxy]-silane,
Phenyl-tris-[(3-ethyloxetanyl-3)-methoxy]-silane,
Tetracis-[(5-ethyl-1,3-dioxanyl-5)-methoxy]-silane,
Methyl-tris-[(5-ethyl-1,3-dioxanyl-5)-methoxy] -silane,
Tetracis-(2,3-epoxy-propoxy)-silane and
Methyl-tris-(2,3-epoxy-propoxy)-silane.

The mixtures of A) and B) according to the invention may contain both one phosphine and several phosphines and both one silicon compound and several silicon compounds.

The mixtures of the components A)+B) are produced, for example, by mixing the components together in inert atmosphere at room temperature or with slight heating.

The invention therefore also provides a process for producing the mixtures of components A)+B) according to the invention, which is characterized in that the components are mixed together in inert conditions at 20° C. to 100° C., preferably at 30° C. to 80° C.

The mixtures of A)+B) according to the invention may also contain silicon-free oxetane compounds (C) and/or silicon-free epoxide compounds (D) in quantities of 1 to 50 wt. %, preferably 5 to 20 wt. %, related to the weight of A)+B) in each case.

The invention therefore-also provides mixtures comprising the components A) and B) in the quantity ratios according to the invention, and 1 wt. % to 50 wt. %, related to weight of A)+B), of silicon-free oxetane compounds (C) and/or of silicon-free epoxide compounds (D).

Oxetane compounds (C) and epoxide compounds (D) are known in the literature (see, for example, EP 0 507 178, loc. cit., and the literature cited therein).

Examples of suitable oxetane compounds (C) are those of formula (IIIa)

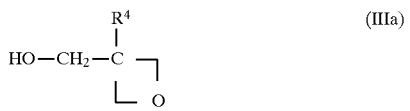

in which
R$^4$ is hydrogen, methyl, ethyl, pentyl, hexadecyl, octadecyl, cyclohexyl, phenyl, p-tolyl, benzyl, methoxymethyl, ethoxymethyl, octadecyloxymethyl, phenoxymethyl, p-tolyloxymethyl, benzyloxymethyl, phenoxy, p-chloro-phenoxy, p-tert.-butylphenoxy and acetyloxymethyl, or of formula (IIIb)

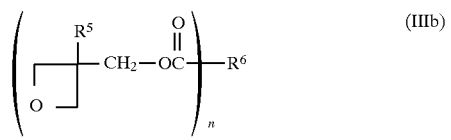

in which
R$^5$ is C$_1$–C$_{16}$-alkyl and R$^6$ is either an n-coordinate C$_2$–C$_8$-alkane which can also be substituted by OH groups, wherein n is a number from 1 to 6 or a 2-coordinate cycloalkane wherein n=2.

Examples of suitable epoxide compounds (D) are mixed polymers containing epoxide groups according to DOS 2 019 325, 3,4-epoxycyclohexylmethyl-3,4-epoxycyclohexane-carboxylate and bis-(3,4-epoxycyclohexyl)-adipate.

The oxetane compounds (C) and/or the epoxide compounds (D) are mixed into the phosphorus component A) or the silicon component B) or into the mixture of A)+B) in known manner at room temperature and at normal pressure.

The effect of the silicon-free oxetane compounds (C) in the mixture of A)+B) according to the invention is an additional improvement of the stabilizer performance.

The effect of the silicon-free epoxide compounds (D) with mixture of A)+B) according to the invention is also an improvement of the stabilizer performance.

The invention therefore further provides the use of the mixtures according to the invention comprising components A) and B) with silicon-free oxetane compounds (C) and/or with silicon-free epoxide compounds (D) to stabilize thermoplastic aromatic polycarbonates.

Thermoplastic aromatic polycarbonates in the meaning of the invention are both hoLmopolycarbonates and copolycarbonates; the polycarbonates may be linear or branched in known manner.

A part, up to 80 mol %, preferably 20 mol % up to 50 mol %, of the carbonate groups in the polycarbonates suitable according to the invention may be replaced by aromatic dicarboxylate groups. Strictly speaking such polycarbonates, which contain both acid groups of carbonic acid and acid groups of aromatic dicarboxylic acids incorporated in the molecular chain are aromatic polyester carbonates. For reasons of simplicity they should be included under the generic term of thermoplastic aromatic polycarbonates in this application.

The polycarbonates to be used according to the invention are produced in known manner from diphenols, carbonic acid derivatives, optionally chain reaction terminators and optionally branching agents, wherein in order to produce the polyester carbonates a part of the carbonic acid derivatives is replaced by aromatic dicarboxylic acids or derivatives of dicarboxylic acids, and indeed according to the carbonate structural units to be replaced in the aromatic polycarbonates, by aromatic dicarboxylate structural units.

Particulars of the production of polycarbonates have been disclosed in hundreds of patent specifications for the last 40 years or so. By way of examples reference will only be made here to "Schnell, Chemistry and Physics of Polycarbonates", Polymer Reviews, Volume 9, Interscience Publishers, New York, London, Sydney 1964, to D C PREVORSEK, B T DEBONA and Y KESTEN, Corporate Research Center, Allied Chemical Corporation, Morristown, New Jersey 07960, "Synthesis of Poly(ester Carbonate) Copolymers" in Journal of Polymer Science, Polymer Chemistry Edition, Vol. 19, 75–90 (1980), to D Freitag, U Grigo, P R Müller, N Nouvertne, BAYER AG, "Polycarbonates" in Encyclopedia of Polymer Science and Engineering, Volume 11, Second Edition, 1988, pages 648-718 and finally to Drs U Grigo, K Kircher and P R Müller "Polycarbonate" in Becker/Braun, Kunststoff-Handbuch, Vol. 3/1, Polycarbonate, Polyacetale, Polyester, Celluloseester, Carl Hanser Publishers, Munich, Vienna; 1992, pages 117–299.

The thermoplastic polycarbonates including the thermoplastic aromatic polyester carbonates have average molecular weights $\overline{M}w$ (determined by measuring the relative viscosity at 25° C. in $CH_2Cl_2$ and a concentration of 0.5 g per 100 ml of $CH_2Cl_2$) of 12,000 to 120,000, preferably 18,000 to 80,000 and particularly 22,000 to 60,000.

Examples of diphenols which are suitable for producing the polycarbonates to be used according to the invention are hydroquinone, resorcinol, dihydroxydiphenyl, bis-(hydroxyphenyl)-alkanes, bis(hydroxyphenyl)-cycloalkanes, bis-(hydroxy-phenyl)-sulphides, bis-(hydroxyphenyl)-ethers, bis-(hydroxyphenyl)-ketones, bis-(hydroxyphenyl)-sulphones, bis-(hydroxyphenyl)-sulphoxides, α,α'-bis-(hydroxyphenyl)-diisopropylbenzenes, as well as their compounds alkylated in the nucleus and halogenated in the nucleus.

Preferred diphenols are 4,4'-dihydroxydiphenyl, 2,2-bis-(4-hydroxyphenyl)-propane, 2,4-bis-(4-hydroxyphenyl)-2-methylbutane, 1,1-bis-(4-hydrbxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulphone, 2,4-bis-(3,5-dimethyl-4-hydroxyphenyl)-2-methylbutane, 1,1-bis-(3,5-dimethyl-4-hydroxyphenyl)-p-diisopropylbenzene, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-3,3,5-trimethylcyclohexane.

Particularly preferred diphenols are 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-cyclohexane and 1,1-bis-(4-hydroxyphenyl)-3,3,5,-trimethylcyclohexane.

These and further suitable diphenols are described, for example, in U.S. Pat. Nos. 3,028,635, 2,999,835, 3,148,172, 2,991,273, 3,271,367, 4,982,014 and 2,999,846, in German published specifications 1 570 703, 2 063 050, 2 036 052, 2 211 956 and 3 832 396, French patent specification 1 561 518, the monograph "H Schnell, Chemistry and Physics of Polycarbonates, Interscienice Publishers, New York 1964" and in Japanese published specifications 62039/1986, 62040/1986 and 105550/1986.

In the case of homopolycarbonates only one diphenol is used, in the case of copolycarbonates, several diphenols are used.

Suitable chain reaction terminators are both monophenols and monocarboxylic acids. Suitable monophenols are phenol itself, alkylphenols such as cresols, p-tert.-butyl phenol, p-n-octyl phenol, p-iso-octyl phenol, p-n-nonyl phenol and p-iso-nonyl phenol, halogenated phenols such as p-chlorophenol, 2,4-dichlorophenol, p-bromophenol and 2,4,6-tribromophenol.

Suitable monocarboxylic acids are benzoic acid, alkylbenzoic acids and halogenated benzoic acids.

Preferred chain reaction terminators are the phenols of formula (III):

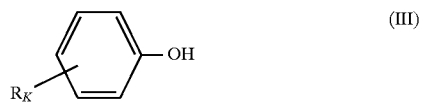

in which $R_K$ is a branched or unbranched $C_8$- and/or $C_9$-alkyl group.

The quantity of chain reaction terminator to be used is 0.5 mol % to 10 mol %, related to mols of diphenols used in each case. The chain reaction terminators may be added before, during or after phosgenation.

Suitable branching agents are the tri or more than trifunctional compounds known in polycarbonate chemistry, particularly those with three or more than three phenolic OH groups.

Examples of suitable branching agents are phloroglucinol, 4,6-dimethyl-2,4,6-tri-(4-hydroxyphenyl)-heptene-2,4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, 2,6-bis-(2-hydroxy-5'-methyl-benzyl)-4-methylphenol, 2-(4-hydroxyphenyl)-2-(2, 4-dihydroxyphenyl)propane, hexa-(4-(4-hydroxyphenyl-isopropyl)phenyl)-orthoterephthalate, tetra-(4-hydroxyphenyl)-methane, tetra-(4-(4-hydroxyphenyl-isopropyl)-phenoxy)-methane and 1,4-bis(4'-4"-dihydroxytriphenyl)-methyl)-benzeneas well as 2,4-dihydroxybenzoic acid, trimesic acid, cyanuric chloride and 3,3-bis-(3-methyl-4-hydroxyphenyl)-2-oxo-2,3-dihydroindole.

The quantity of the branching agents optionally to be used is 0.05 mol % to 2 mol %, again related to mols of diphenols used in each case.

The branching agents may either be presented with the diphenols and the chain reaction terminators in the aquecusly-alkaline phase, or be added dissolved in an organic solvent prior to phosgenation.

All these measures for producing polycarbonates are familiar to the person skilled in the art.

Examples of aromatic dicarboxylic acids suitable for producing the polyester carbonates are orthophthalic acid, terephthalic acid, isophthalic acid, tert.-butylisophthalic acid, 3,3'-diphenyl dicarboxylic acid, 4,4'-diphenyl dicarboxylic acid, 4,4-benzophenone dicarboxylic acid, 3,4'-benzophenone dicarboxylic acid, 4,4'-diphenylether dicarboxylic acid, 4,4'-diphenylsulphone dicarboxylic acid, 2,2-bis-(4-carboxyphenyl)-propane, trimethyl-3-phenylindane-4,5'-dicarboxylic acid.

Of the aromatic dicarboxylic acids, terephthalic acid and/or isophthalic acid are particularly preferably used.

Derivatives of dicarboxylic acids are the dicarboxylic dihalides and the dicarboxylic dialkylesters, particularly the dicarboxylic acid dichlorides and the dicarboxylic dimethylesters.

The replacement of the carbonate groups by the aromatic dicarboxylate groups substantially takes place stoichiometrically and also quantitatively, so that the molar ratio of the reaction partners also reappears in the finished polyester carbonate. The incorporation of the aromatic dicarboxylate groups can take place both randomly and block-wise.

Preferred methods of producing the polycarbonates to be used according to the invention, including the polyester carbonates, are the known interface process and the known melt transesterification process.

In the former case phosgene and optionally dicarboxylic acid dichlorides preferably serve as acid derivatives, in the latter case preferably diphenyl carbonate and optionally dicarboxylic acid diester. Catalysts, solvents, working up, reaction conditions etc. for producing polycarbonate and/or polyester carbonate are adequately described and known in both cases.

The stabilizer quantities to be used are between 0.001 and 1 wt. %, preferably between 0.002 and 0.5 wt. % and particularly between 0.005 and 0.2 wt. %, related in each case to total weight of thermoplastic polycarbonate and stabilizer mixture comprising components A)+B).

The invention therefore also provides thermoplastic aromatic polycarbonates with a content of the mixtures of the components A) and B) according to the invention in quantities of 0.001 wt. % to 1 wt. %, preferably 0.002 wt. % to 0.5 wt. % and particularly 0.005 wt. % to 0.2 wt. %, related in each case to total weight of thermoplastic polycarbonate and stabilizer mixture comprising components A)+B).

The invention therefore further provides the thermoplastic aromatic polycarbonates with the content according to the invention of stabilizer mixture comprising A)+B) and additionally with a content of 1 wt. % to 50 wt. %, related to weight of A)+B), of silicon-free -oxetane compounds (C) and/or silicon-free epoxide compounds (D).

The stabilizer mixtures are advantageously incorporated into the thermoplastic aromatic polycarbonates when the polycarbonate is produced. The stabilizer mixtures can be continuously introduced by means of a suitable feed pump during the final phase of production, in which the molten polycarbonate is continuously freed from the solvent in a worm conveyor under vacuum. It is, of course, also possible to stabilize the polycarbonate with the stabilizer mixture after it has been produced, by means of so-called rolling up, this method is described in the examples of this application. In this case the stabilizer mixture is mixed with the polycarbonate either solventless or dissolved in a solvent and compounded on a ZSK 32 extruder at 270° C.

Suitable solvents for the stabilizer mixtures are methylene chloride, isopropanol, toluene, methylethylketone and tetrahydrofuran.

The invention therefore also provides a process for producing the stabilized, thermoplastic aromatic polycarbonates which is characterized in that stabilizer mixtures comprising components A) and B) and optionally C) and/or D) are mixed with the polycarbonate either solventless or dissolved in a solvent during or after the production of the thermoplastic polycarbonate and compounded on an extruder.

To produce the stabilized polycarbonates the components A), B) and optionally C) and/or D) may also be incorporated into the polycarbonates individually one after the other in any sequence. It is not therefore absolutely necessary to produce the component mixture in question in advance.

Components A), B) and optionally C) and/or D) can also be incorporated into the polycarbonate according to the known masterbatch process via a concentrate in the polycarbonate which is then diluted to the desired final concentration of stabilizer mixture according to the invention in the polycarbonate moulding compound by mixing with further polycarbonate.

The polycarbonates which can be obtained according to the invention may be processed into moulded bodies of any kind, including films, therefore, in known manner. Processing into moulded bodies takes place, for example, according to known injection moulding processes at temperatures between 270° C. and 350° C.

The polycarbonates stabilized according to the invention are used in particular where the moulded bodies produced are exposed to prolonged high thermal stress, and especially for all objects for which high light transmission is required. This preferably applies to use in the lighting sector, e.g. for lamp covers or glazing with polycarbonate panels, or for optical applications such as spectacles and compact discs.

The invention therefore further provides the use of the polycarbonates stabilized according to the invention to produce lamp covers, glazing, spectacles and compact discs.

The parts quoted in the examples are parts by weight.

The thermoplastic polycarbonates stabilized according to the invention may also be mixed with other thermoplastics in known manner, such as with ABS polymers, polystyrenes, polyalkylene terephthalates or polyarylene sulphones.

Producing a polycarbonate 454 parts of 2,2-bis-(p-hydroxyphenyl)-propane and 2.5 parts of p.-tert.-butyl phenol are suspended in 1.5 litres of water in a three-necked flask equipped with agitator and gas feed pipe and the oxygen is then removed from the reaction mixture by passing nitrogen through the reaction mixture for 15 minutes under agitation. 355 parts of 45% soda lye and 1000 parts of methylene chloride are then added. The mixture was cooled to 25° C. With this temperature being maintained by cooling, 237 parts of phosgene are added over a period of 120 minutes. An additional quantity of 75 parts of a 45% soda lye was added after 15 to 30 minutes and/or after the phosgene absorption had begun. 1.6 parts of triethylamine are added to the resulting solution and the mixture stirred for a further 15 minutes. A highly viscous solution is obtained, the viscosity of which is regulated by adding methylene chloride. The aqueous phase is separated off. The organic phase is washed salt and alkali free with water. The polycarbonate is isolated from the washed solution and dried. The polycarbonate has a relative viscosity of 1.29 to 1.30, measured in a 0.5% solution of methylene chloride at 20° C. This approximately corresponds to a molecular weight of 32,000. The polycarbonate obtained in this way is extruded and granulated.

I. Producing stabilized polycarbonates

The above polycarbonate with a relative viscosity of 1.295 is compounded on a ZSK 32 extruder at 270° C. with the stabilizers listed in the examples. The products are sprayed off to standard small rods at 300° C. For comparison purposes the unstabilized polycarbonate is extruded at 270° C. one more time. This causes the relative viscosity to drop to 1.289.

II. Producing special phosphines

EXAMPLE 1

Accompanied by nitrogen a mixture of 18.7 wt. % of 1,2-bis-(diphenylphosphino)-ethane and 81.3 wt. % of methyl-tris-[(3-ethyloxetanyl-3)-methoxy]-silane is produced by dissolution at 80° C. P content: 2.9%; Si content: 5.8% This mixture is incorporated into polycarbonate at 0.2%.

EXAMPLE 2

Accompanied by nitrogen a mixture of 19.8 wt. % of 1,4-bis-(diphenylphosphino)-butane and 80.2 wt.% of methyl-tris-[(3-ethyloxetanyl-3)-methoxy]-silane is produced by dissolution at 80° C. P content: 2.8%; Si content: 5.7% This mixture is incorporated into polycarbonate at 0.2%.

III. Comparative experiments

Comparative example 1

Polycarbonate which contains no stabilizer and was processed as described above.

Comparative example 2 (EP 213 413)

Polycarbonate which contains 0.1% of triphenylphosphine (Techno-Chemie) and was processed as described above. P content of triphenylphosphine: 11.8%.

Comparative example 3

Polycarbonate which contains 0.1% of 1,2-bis-(diphenylphosphino)-ethane and was processed as described above.

Comparative example 4 (EP 43 998)

Accompanied by nitrogen a mixture of 40 wt. % of triphenylphosphine and 60 wt. % of methyl-tris-[(3-ethyloxetanyl-3)-methoxy]-silane is produced by dissolution at 80° C. P content: 4.7%; Si content: 4.3% This mixture is incorporated into polycarbonate at 0.1%.

IV. Results

Heat ageing

The test bodies produced in the manner described above were tempered in the drying cabinet at 140° C. The increase in the Yellowness Index (Y.I.), measured according to ASTM 1925, in the course of the heat treatment is used as a measure of the increasing browning of the test bodies. The light transmission is measured at 420 nm according to DIN 5033, 4646.

Hydrolysis test

A number of test bodies is stored in distilled water at 100° C. At the end of particular time intervals 10 test bodies are removed at a time and the relative viscosity $\eta_{rel}$ (in methylene chloride at 25° C. in 0.5 wt. %) measured on them. The decrease in $\eta_{rel}$ is a measure of the increasing hydrolysis during storage in water. The average values from 10 individual measurements are quoted in the table below.

|  | Time (hrs) | Transmission % at 420 nm | Y.I. | $\eta_{rel}$ |
|---|---|---|---|---|
| Example 1 | 0 | 83.5 | 3.4 | 1.287 |
|  | 1000 | 77.5 | 7.0 | 1.243 |
| Example 2 | 0 | 83.5 | 3.5 | 1.281 |
|  | 1000 | 77.0 | 7.6 | 1.162 |
| Comparison 1 | 0 | 82.2 | 6.6 | 1.289 |
|  | 1000 | 74.7 | 12.3 | 1.228 |
| Comparison 2 | 0 | 83.4 | 5.0 | 1.289 |
|  | 1000 | 80.7 | 11.7 | 1.248 |

-continued

|  | Time (hrs) | Transmission % at 420 nm | Y.I. | $\eta_{rel}$ |
|---|---|---|---|---|
| Comparison 3 | 0 | 82.5 | 4.4 | 1.287 |
|  | 1000 | 81.3 | 8.0 | 1.240 |
| Comparison 4 | 0 | 84.1 | 4.8 | 1.289 |
|  | 1000 | 72.3 | 10.9 | 1.244 |

We claim:

1. Mixtures comprising

A) phosphines of formula (I)

in which R is an unsubstituted or substituted $C_6$–$C_{14}$-aryl group and
in which $R^1$ is one of the following groups (Ia) to (Ih)

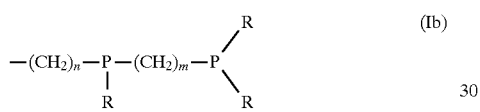

with Ar = $C_6$–$C_{14}$-arylene,

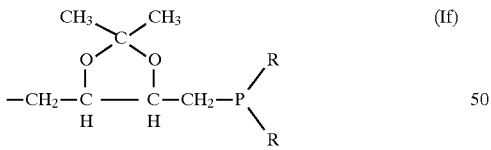

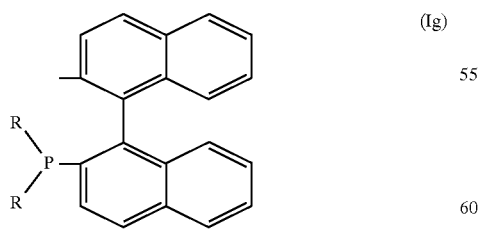

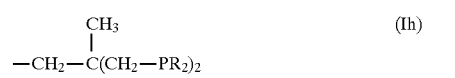

in which R has the meaning quoted for formula (I),

"n" and "m" are a whole number from 1 to 7, independently of each other in each case,
and wherein the H-atoms of the groups (Ia) to (Ic) can also be replaced by

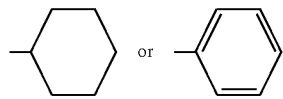

and wherein $R^1$ can also be 4-phenyl-phenyl or α-naphthyl when both R's in formula (I) are also 4-phenyl-phenyl or α-naphthyl in each case,
wherein the 4-phenyl-phenyl and the α-naphthyl groups can also be substituted, and B) silicon compounds of formula (II)

in which a+b=4, b is at least 1, $R^2$ is H or $C_1$–$C_{18}$-alkyl, $C_2$–$C_{18}$-alkenyl, $C_6$–$C_{24}$-aryl, $C_7$–$C_{24}$-alkylaryl or $C_7$–$C_{24}$-aralkyl and $R^3$ is $C_1$–$C_{18}$-alkyl, $C_2$–$C_{18}$-alkenyl, $C_5$–$C_{10}$-cycloalkyl or $C_7$–$C_{24}$-aralkyl,
wherein the molar ratio of (A) to (B) is between 0.01 and 3.5.

2. Process for producing the mixtures of claim 1, characterized in that the components are mixed with one another in inert conditions at 20° C. to 100° C.

3. Mixtures according to claim 1, additionally comprising 1 wt. % to 50 wt. %, related to weight of A)+B), of silicon-free oxetane compounds (C) and/or silicon-free epoxide compounds (D).

4. Thermoplastic aromatic polycarbonates with a content of the mixtures of claim 1 in quantities of 0.001 wt. % to 1 wt. %, related in each case to total weight of thermoplastic polycarbonate and stabilizer mixture comprising A)+B).

5. Polycarbonates according to claim 4 with an additional content of 1 wt. % to 50 wt. %, related to weight of A)+B), of silicon-free oxetane compounds (C) and/or silicon-free epoxide compounds (D).

6. Process for producing thermoplastic aromatic polycarbonates stabilized with 0.001 wt. % to 1 wt. % of the mixture of claim 1, related in each case to the total weight of polycarbonate and stabilizer mixture, comprising mixing the stabilizer mixture of claim 1 with polycarbonate, either solventless or dissolved in the solvent, during or after production of the thermoplastic polycarbonate and compounding on an extruder.

7. The process of claim 6 comprising additionally mixing 1 wt. % to 50 wt. % (related to the weight of A)+B)) of silicon-free oxetane compounds (C) and/or silicon-free epoxide compounds (D) with the polycarbonate and stabilizer mixture.

8. Thermoplastic polycarbonate which contains the mixture of claim 1 as stabilizer.

9. Thermoplastic polycarbonate which contains the mixture of claim 3 as stabilizer.

10. A lamp cover, glazing, spectacle or compact disc produced from the polycarbonate of claim 8.

* * * * *